Aug. 27, 1935.  C. MEYER  2,012,766

METHOD OF MAKING SINUOUS BULGES ON PIPES

Filed Nov. 8, 1934

Inventor:
C. Meyer
by:
Glascock Downing & Seebold
Attys.

Patented Aug. 27, 1935

2,012,766

UNITED STATES PATENT OFFICE 2,012,766

METHOD OF MAKING SINUOUS BULGES ON PIPES

Curt Meyer, Berlin, Germany, assignor to the firm Allgemeine Rohrleitung Aktiengesellschaft, Dusseldorf, Germany, and to the firm Franz Seiffert & Co., Aktiengesellschaft, Berlin, Germany Application November 8, 1934, Serial No. 752,139
In Germany November 29, 1932

6 Claims. (Cl. 153—73)

My invention relates to the production of sinuous or wavy bulges on thick-walled pipes, such as are used for conducting steam, water and other fluids under pressure. Such bulges are usually made by successively heating separate adjacent zones, or zones separated by a distance, on the straight pipe and exerting a longitudinal pressure on the pipe after each heating operation. In the case of straight pipes, in which the bulges go all round the whole periphery of the pipe, the heating of the zones is effected on the whole circumference of the pipe and the longitudinal pressure is exerted by pressing the pipe in an axial direction, whilst in the case of pipe bends, in which the bulges lie only on the inner side of the bend, the zones are heated preferably only on the inner side of the bend and the pressure is produced by a small bending which is effected each time.

The object of my invention is to produce such bulges in a manner such that, viewed in the longitudinal section of the pipe, they proceed in approximation to the sine curve. A further object is so to make the bulges that the crests and troughs of the sinuous folds on the finished pipe, when it is subjected to pull, pressure or bending, partake in equal manner of the change in shape. A further object is so to make pipes with bulges that they are more resilient than the pipes made by the process set forth in the preceding paragraph, i. e. so that they yield more easily when they are strained by pull, pressure or bending.

In the method of manufacture described above the heated zone where the bulge forms tends to arch outwardly in a bend of small radius, whilst the radius of curvature of the parts situated between the heated zones is considerably greater. In this way folds or waves are formed in which the crests are more strongly curved than the trough portions. Such corrugated formations have the disadvantage that under tension, pressure or bending stresses the crest portions of the corrugations are stressed more strongly and more unfavourably than the trough parts. Uniform stressing of the crest portions of the corrugations and of the trough parts can be brought about by making the semi-dimensions of the trough parts as equal as possible to the semi-dimensions of the crest parts.

The uniform distribution of the shape change on the elevated parts and the recessed parts of the corrugations results in a pipe which is corrugated in this way being more yielding than a pipe in which the bulges are separated from one another by indentations of greater radius. Moreover in a pipe in which the bulges are more closely adjacent more bulges are produced in a given length than on a similar pipe on which the bulges have been produced in the known way. In this way the resiliency of the pipe is raised still further.

In order in the production of bulges by heating individual zones and exerting an axial or bending pressure on each occasion to obtain elevations and recesses in the corrugations which are shaped as uniformly as possible, according to the invention the neighbouring heating zones are permitted to overlap, but only to such an extent that the crest of the corrugation which is already formed is not heated again.

The accompanying drawing illustrates my process. In the drawing.

Figure 1:
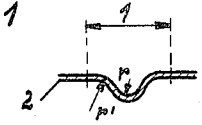
Fig. 1 shows the position of a corrugation elevation or crest with respect to the heating zone.
Figure 2:
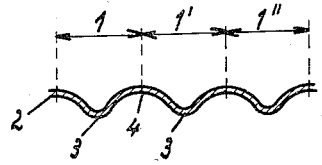
Fig. 2 shows a succession of corrugation elevations and recesses according to the old process.

In Fig. 1 heat is uniformly supplied to the zone 1 and in this zone, therefore, at first an approximately uniform heating takes place, which however thereupon gradually diminishes at the edges of this zone in consequence of the conduction of heat towards the neighbouring, non-heated, pipe parts. On exerting a longitudinal pressure the pipe wall 2 outwardly arches with a small radius $r$ at the hottest part of the zone, whilst the radii $r'$ of the recessed parts of the corrugation coming in the colder edges of the zone 1 are greater. If, according to Fig. 2, several abutting zones 1, 1', 1" are heated after one another and each time fold elevations 3 outwardly bent by means of longitudinal or bending pressure, then the intermediately situated pipe sections 4, which represent the troughs of the corrugations, are considerably flatter than the elevated parts of the corrugations. This corresponds to the method of production heretofore usual.

Figure 3:
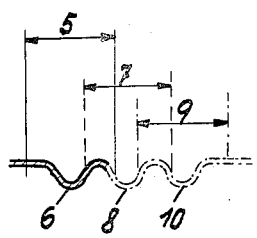
Fig. 3 shows the same succession in the process according to the invention.

According to the new process schematically shown in Fig. 3 the pipe is first heated over a zone 5 and a bulge 6 produced by means of axial pressure or bending which corresponds to the bulge according to Fig. 1. After cooling a second zone 7 is heated which, as well as the bulge 8 produced thereby, is shown in dashed lines. The zone 7 overlaps the zone 5 to an extent such that only the edge of the bulge 6 experiences the weak heat at the edge of the zone 7, the bulge itself, however, is not heated again and therefore is not shaped again by the exertion of pressure. It may, if necessary, be artificially cooled for this purpose. The corrugation recess 4 is thereby bent together to a smaller radius, and the newly formed bulge 8 is closely annexed to the bulge 6. In the same way, a zone 9 overlapping the zone 7 is then heated in order to produce a bulge 10, both of which are shown in dot and dash lines, and so forth. In this way corrugations or folds are formed which in cross section proceed more or less exactly in sine form, and in which the pressure, tension or bending stresses are distributed more favourably on all parts of the pipe wall than in the case of the known corrugated or folded pipes.

In many cases it is advisable first to make bulges which are not immediately adjacent and then to produce bulges between the same. For example, first of all the first, third, fifth, and so forth, bulge is produced and then between these the second, fourth, and so forth, bulge in such a manner that the zones heated thereby overlap the zones which have been heated during the formation of the previously heated zones. Here also the apex of the neighbouring bulge may be artificially cooled. This is advisable both in the case of straight pipes with ring-like corrugations around as well as in the case of bent pipes with bulges on only one side.

According to my process pipes may also be made which are straight in one part and have ring-like corrugations running round and in another part are bent and are provided with bulges on the inner side of the curve.

Figure 4:
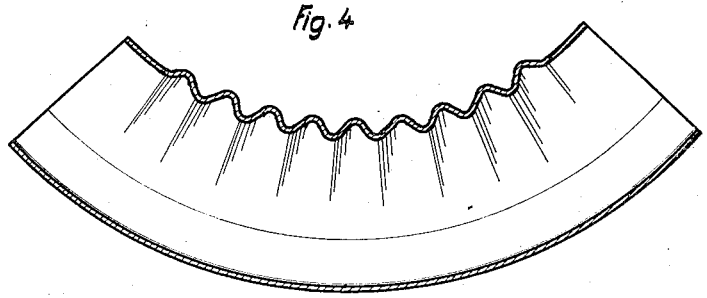
Fig. 4 shows a pipe bend made according to the invention.

Fig. 4 shows in section a bent pipe made in the said manner. In the case of these pipes I have found that the width of the heating zone overlap is preferably chosen in a definite ratio to the radius of curvature of the bent pipe coming into question. It has been found that the most favourable width of the heating zone overlap is, for example, in the case of a radius of curvature R of the pipe bend equal to the threefold nominal diameter of the pipe 8.7% and in the case of R equal to the fourfold nominal diameter 13%.

Figure 5:
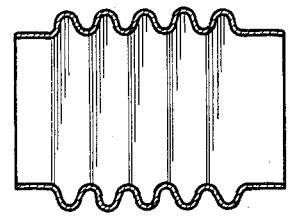
Fig. 5 shows a straight pipe made according to the invention with corrugations running round the same in rings.

Fig. 5 is a straight pipe made according to the invention.

Figure 6:
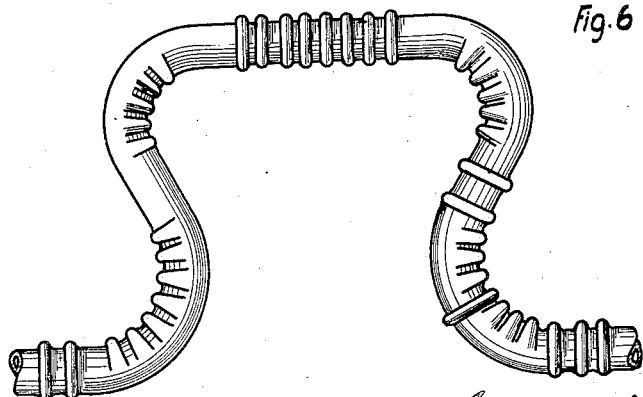
Fig. 6 is a pipe one part of which is straight and with bulges running round, whilst another part is bent and is provided with bulges on one side.

Fig. 6 is a pipe bend made according to the invention, which is provided partly with bulges which go round the pipe like rings and partly with bulges on one side.

What I claim is:—

1. A method of forming bulges on pipes adapted to withstand internal pressure, consisting in heating a zone of the pipe, exerting a longitudinal pressure on the pipe in order to bulge the heated place outwardly, then directly heating a further zone which overlaps the previously heated zone and extends to the adjacent base of the bulge already formed and applying a longitudinal pressure on the pipe in order to bulge the heated place outwardly.

2. A method of forming bulges on pipes adapted to withstand internal pressure, consisting in heating a zone on one side of the pipe, bending the pipe somewhat towards the side of the heated place so that the heated place is bulged outwardly, directly heating a further zone which overlaps the previously heated zone and extends to the adjacent base of the bulge formed, and bulging the heated part outwardly by a small bending of the pipe.

3. A method of forming bulges on pipes adapted to withstand internal pressure, consisting in heating a zone on one side of the pipe, bending the pipe somewhat towards the side of the heated place so that the heated place is bulged outwardly, heating a further zone which overlaps the bulge previously formed to the extent of 8.7% for a radius of curvature of the pipe bend equal to three times the nominal diameter of the pipe, and bulging the heated part outwardly by a small bending of the pipe.

4. A method of forming bulges on pipes adapted to withstand internal pressure, consisting in heating a zone on one side of the pipe, bending the pipe somewhat towards the side of the heated place so that the heated place is bulged outwardly, heating a further zone which overlaps the bulge previously formed to the extent of 13% for a radius of curvature of the pipe bend equal to four times the nominal diameter of the pipe, and bulging the heated part outwardly by a small bending of the pipe.

5. A method of forming bulges on pipes adapted to withstand internal pressure, consisting in heating a zone of the pipe, bulging the pipe wall outwardly by means of a pressure exerted on the pipe in a longitudinal direction, bulging outwardly in the same manner places on the pipe which are at a spaced distance apart, bulging outwardly other places between the aforementioned places by heating at each place a zone which overlaps the zones which were heated in forming adjacent bulges and extends to the bases of said adjacent bulges and then exerting a longitudinal pressure on the pipe.

6. A method of making pipes which are partly straight and partly bent consisting in making ring-like bulges around individual parts by directly heating individual zones and exerting a longitudinal pressure on the pipe after each heating operation and in forming one-sided bulges by directly heating a zone on the inner side of the curvature to be formed and effecting a small bending of the pipe, each heated zone overlapping a previously heated zone and extending to the base of the previously formed bulge.

CURT MEYER.